United States Patent
Parker

(10) Patent No.: US 7,591,623 B2
(45) Date of Patent: Sep. 22, 2009

(54) HEAVY METAL PIERCE NUT

(75) Inventor: John M. Parker, Ann Arbor, MI (US)

(73) Assignee: Whitesell International Corporation, Florence, AL (US)

( * ) Notice: Subject to any disclaimer, the term of this patent is extended or adjusted under 35 U.S.C. 154(b) by 0 days.

(21) Appl. No.: 11/796,079

(22) Filed: Apr. 26, 2007

(65) Prior Publication Data

US 2007/0231105 A1    Oct. 4, 2007

Related U.S. Application Data

(60) Provisional application No. 60/745,965, filed on Apr. 28, 2006.

(51) Int. Cl.
*F16B 37/04* (2006.01)
(52) U.S. Cl. .................... 411/180; 411/188
(58) Field of Classification Search ............. 411/179, 411/180, 181, 187, 188
See application file for complete search history.

(56) References Cited

U.S. PATENT DOCUMENTS

| | | |
|---|---|---|
| 1,332,686 A | 3/1920 | Reynolds |
| 1,919,552 A | 7/1933 | Hasselquist |
| 2,037,586 A | 4/1936 | Olson |
| 2,128,757 A | 8/1938 | Olson |
| 2,147,211 A * | 2/1939 | Olson .................. 411/187 |
| 3,000,420 A | 9/1961 | Spokes |
| 3,127,919 A * | 4/1964 | Swanstrom ............ 411/188 |
| 3,133,579 A * | 5/1964 | Grimm et al. .......... 411/180 |
| 3,213,914 A | 10/1965 | Baumle et al. |
| 3,234,987 A | 2/1966 | Hentzi |
| 3,253,631 A | 5/1966 | Reusser |
| 3,282,315 A | 11/1966 | Zahodiakin |
| 3,282,317 A | 11/1966 | Zahodiakin |
| 3,358,727 A | 12/1967 | Hughes |
| 3,640,326 A | 2/1972 | Brown |
| 3,736,969 A | 6/1973 | Warn et al. |
| 3,810,291 A | 5/1974 | Ladouceur |
| 3,878,599 A | 4/1975 | Ladouceur |
| 3,910,331 A | 10/1975 | Randall |
| 4,018,257 A * | 4/1977 | Jack ..................... 411/181 |
| 4,389,766 A | 6/1983 | Capuano |
| 4,432,681 A | 2/1984 | Capuano |

(Continued)

FOREIGN PATENT DOCUMENTS

EP    0561715 A1    3/1993

(Continued)

*Primary Examiner*—Flemming Saether

(57) ABSTRACT

A self-attaching fastener includes a pilot portion having an outer side wall and is surrounded by an annular flange. The annular flange includes a planar end face defining a peripheral edge with a diameter greater than a diameter of said outer side wall of the pilot portion. The end face includes a plurality of first circumferentially spaced anti-rotation elements each having a planar top face spaced above the planar end face of the annular flange and a second plurality of second circumferentially spaced anti-rotation elements each having a planar top face spaced below the planar end face of the annular flange. Each of the first and second anti-rotation elements extend from about one of the peripheral edge of the annular flange and the outer side wall to a location spaced from the other of the peripheral edge of the flange portion and the outer side wall of the pilot portion.

19 Claims, 3 Drawing Sheets

U.S. PATENT DOCUMENTS

| | | | |
|---|---|---|---|
| 4,486,133 A | 12/1984 | Pletcher | |
| 4,543,023 A | 9/1985 | Capuano | |
| 4,627,776 A | 12/1986 | Pamer et al. | |
| 4,637,766 A | 1/1987 | Milliser | |
| 4,690,599 A * | 9/1987 | Shinjo | 411/180 |
| 4,708,556 A | 11/1987 | Pamer et al. | |
| 4,810,143 A | 3/1989 | Muller | |
| 4,831,698 A | 5/1989 | Muller | |
| 4,893,976 A | 1/1990 | Milliser et al. | |
| 4,911,592 A | 3/1990 | Muller | |
| 5,207,588 A | 5/1993 | Ladouceur et al. | |
| 5,244,326 A | 9/1993 | Henriksen | |
| 5,251,370 A | 10/1993 | Muller et al. | |
| 5,302,066 A | 4/1994 | Bieschke et al. | |
| 5,335,411 A | 8/1994 | Muller et al. | |
| 5,340,251 A | 8/1994 | Takahashi et al. | |
| 5,423,645 A | 6/1995 | Muller et al. | |
| 5,502,888 A | 4/1996 | Takahashi et al. | |
| 5,509,766 A | 4/1996 | Leuschner | |
| 5,531,552 A | 7/1996 | Takahashi et al. | |
| 5,549,430 A | 8/1996 | Takahashi et al. | |
| 5,613,815 A | 3/1997 | Muller | |
| 5,772,376 A | 6/1998 | Konig | |
| 5,782,594 A | 7/1998 | Muller | |
| 5,882,159 A | 3/1999 | Muller | |
| 6,004,087 A | 12/1999 | Muller | |
| 6,081,994 A | 7/2000 | Muller | |
| 6,108,893 A | 8/2000 | Wojciechowski et al. | |
| 6,125,524 A * | 10/2000 | Mueller | 29/520 |
| 6,220,804 B1 | 4/2001 | Pamer et al. | |
| 6,257,814 B1 | 7/2001 | Muller | |
| 6,276,040 B1 | 8/2001 | Muller | |
| 6,318,940 B1 * | 11/2001 | Mitts | 411/188 |
| D457,054 S | 5/2002 | Pamer et al. | |
| 6,409,444 B2 | 6/2002 | Pamer et al. | |
| 6,543,979 B2 | 4/2003 | Iwatsuki | |
| 6,604,900 B2 | 8/2003 | Ikami et al. | |
| 6,851,904 B2 | 2/2005 | Parker et al. | |
| 6,994,500 B2 | 2/2006 | Ward et al. | |
| 7,001,125 B2 | 2/2006 | Wojciechowski et al. | |
| 7,066,700 B2 * | 6/2006 | Ward et al. | 411/180 |
| 7,112,024 B2 | 9/2006 | Ward et al. | |
| 7,112,025 B2 | 9/2006 | Ward et al. | |
| 7,258,517 B2 | 8/2007 | Ross et al. | |
| 7,419,344 B2 | 9/2008 | Ward et al. | |
| 2001/0010789 A1 | 8/2001 | Pamer et al. | |
| 2002/0159858 A1 | 10/2002 | Ikami et al. | |
| 2002/0172573 A1 | 11/2002 | Pamer et al. | |
| 2002/0182032 A1 | 12/2002 | Anderson et al. | |
| 2003/0039530 A1 | 2/2003 | Ross et al. | |
| 2004/0042872 A1 | 3/2004 | Ward et al. | |
| 2005/0265801 A1 | 12/2005 | Ward et al. | |

FOREIGN PATENT DOCUMENTS

EP  0864766 A1  9/1998

* cited by examiner

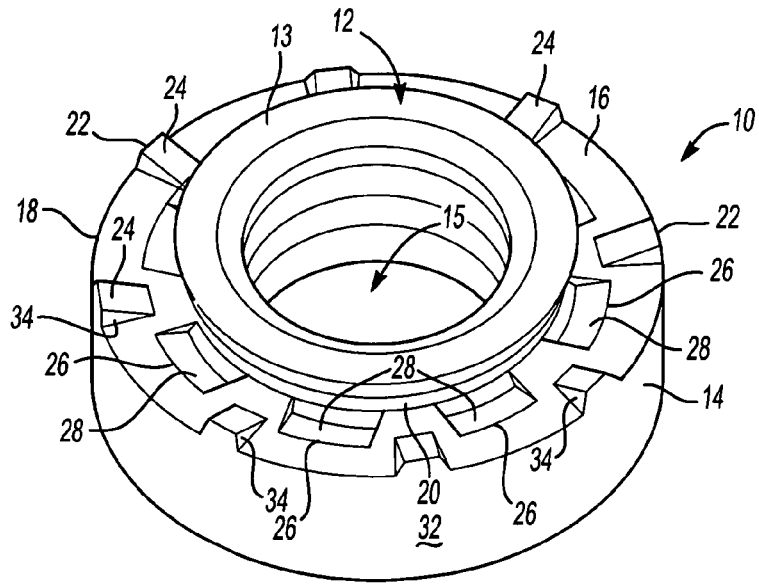
Fig-1
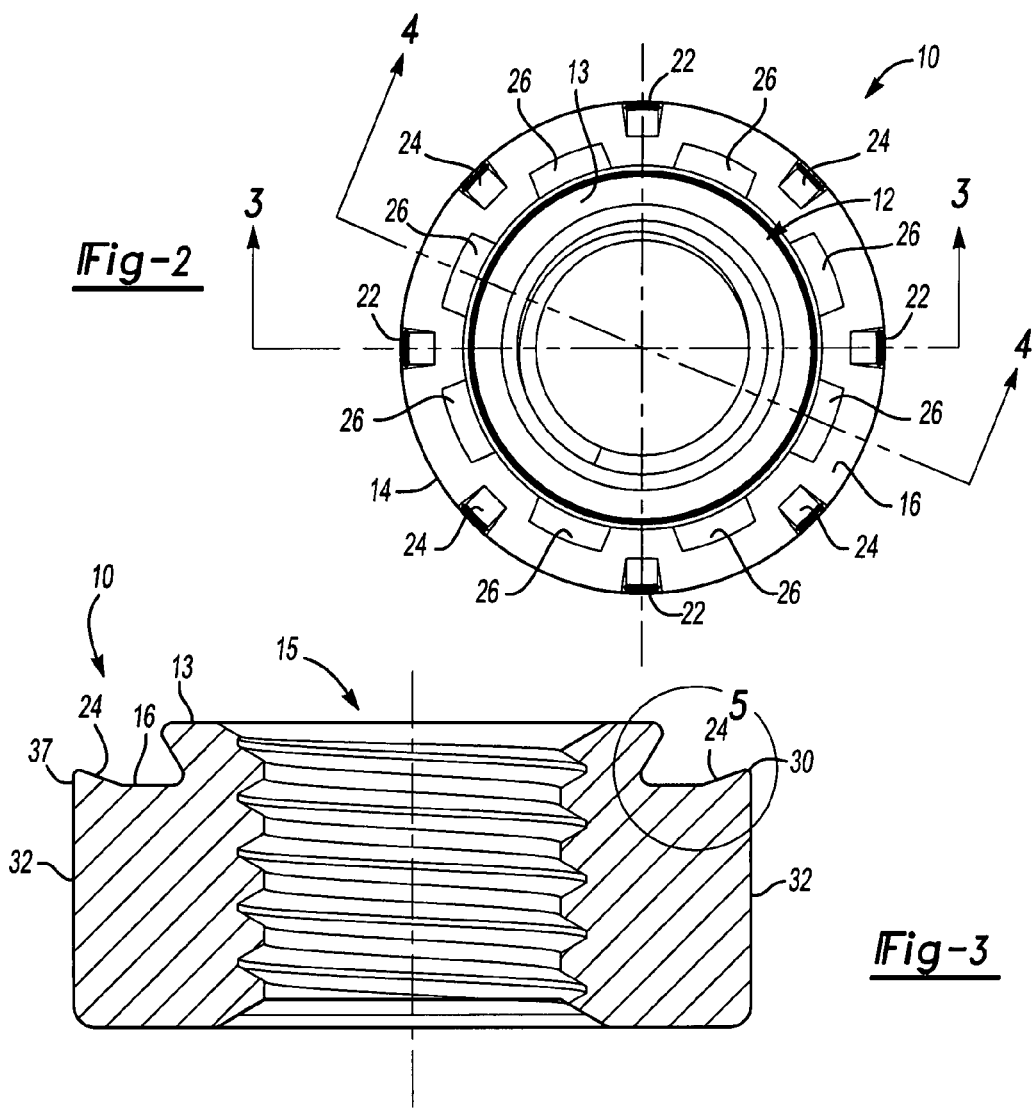
Fig-2
Fig-3

HEAVY METAL PIERCE NUT

RELATED APPLICATION

This application claims priority to Provisional Application Ser. No. 60/745,965 filed Apr. 28, 2006, and to U.S. patent application Ser. No. 11/189,685 filed Jul. 26, 2005, which is a divisional of Ser. No. 10/439,526 filed May 16, 2003, now U.S. Pat. No. 6,994,500 (issued Feb. 7, 2006), which is a continuation-in-part of Ser. No. 10/232,335 filed Aug. 30, 2002, now U.S. Pat. No. 6,851,904 (issued Feb. 8, 2005).

FIELD OF THE INVENTION

This invention relates to self-attaching fasteners, particularly including pierce and clinch nuts and studs, which may be formed by conventional cold header techniques. More specifically, this invention relates to self-piercing and clinching nuts and studs that provide improved retention and resistance to rotation when installed into a panel.

BACKGROUND OF THE INVENTION

Self-attaching female fasteners, including pierce and clinch nuts, formed by cold header techniques and secondary press operations generally include a central pilot portion having an end face defining a bore. An annular flange portion surrounds the central pilot portion and defines a planar panel-supporting end face having an annular groove in the end face of the flange portion that surrounds the pilot portion. An inner side wall surrounds the pilot portion and is separated from an opposed outer side wall by a bottom wall. Generally, at least one of the inner and outer side walls of the annular groove is inclined toward the other side wall to provide a restricted opening to the annular groove adjacent the end face of the flange portion to improve retention of the fastener following installation in a panel. Further improved retention of the fastener to the panel may be provided by inclining both the inner and outer side walls of the annular groove toward the opposed side walls forming a "dovetail" shaped re-entrant groove. When the panel is deformed against the bottom wall of the groove by a die member or a die button having a projecting annular lip configured to be received in the annular groove, the panel is simultaneously deformed beneath the inclined side wall or walls of the annular groove to provide improved retention of the fastener element to the panel. Various types of anti-rotation or torque resistant elements are disposed in the annular groove defined in the flange portion to provide improved torque resistance when installing a bolt or other male threaded fastener using a torque wrench or the like.

The groove described above, and particularly a groove having inclined outer and inner side walls, provide a substantial amount of pull-off force once the self-attaching fastener has been affixed to a panel. However, a groove of this type has proven less effective for heavy metal panels exceeding about 1.5 mm. Specifically, it has proven difficult to deform the heavy metal panel downwardly into the groove and beneath the undercuts associated with the inclined inner and outer side walls. Therefore, the ability of the inclined outer side wall of the flange portion to provide most of the panel retention of the fastener is known to be reduced drastically. Further difficulties arise when it is necessary to install a self-piercing or clinching fastener into a panel having a restricted area such as, for example, an automotive seat frame or the like. Therefore, it is necessary to reduce the foot print of the fastener without losing either necessary retention or torque resistant characteristics.

It has become evident that there is a heart felt need for self-piercing or clinching fastener which can be used in a heavy metal panel without requiring a large foot print while not sacrificing desirable retention or torque resistant characteristics.

SUMMARY OF THE INVENTION

A self-attaching fastener includes a central pilot portion and an annular flange surrounding the central pilot portion. The central pilot portion has an outer side wall that is generally annular. The annular flange portion has a planar end face defining a peripheral edge with a diameter that is greater than a diameter of the outer side wall of the central pilot portion. The planar end face includes a plurality of first circumferentially spaced anti-rotation elements, each having a planar radially extending top face spaced above the planar end face of the annular flange. A second plurality of second circumferentially spaced anti-rotation elements each have a planar radial extending top face spaced below the planar end face of the annular flange. Each of the first and second anti-rotation elements extend from about one of said peripheral edge of the annular flange and the outer side wall of the central pilot portion to a location spaced from the other of the peripheral edge of the flange portion and the outer side wall of the central pilot portion.

The self-attaching fastener of the present invention solves the problem associated with prior art configurations, in particular, for use in heavy metal and in a restricted area requiring a fastener with a small foot print. The pilot height of the inventive fastener is adjustable to account for increased panel thicknesses. Furthermore, the absence of an outer annular wall enables the die button to more effectively deform a heavy metal panel radially inwardly beneath the undercut of the pilot portion of the inventive fastener. The deformation of the heavy metal panel beneath the undercut of the pilot portion has proven to provide adequate pull-out resistance not provided by thin metal panels without an outer annular wall. Additionally, the elimination of the outer annular wall significantly decreases the foot print of the inventive pierce fastener enabling the use of the pierce fastener in confined areas that previously required the use of a weld nut or other alternative fastener.

BRIEF DESCRIPTION OF THE DRAWINGS

Other advantages and meritorious features of the self-attaching fastener will be more fully understood from the description of the preferred embodiments, dependent claims and the drawings.

FIG. 1 is a perspective view of one embodiment of the self-attaching fastener of the present invention;

FIG. 2 is a top view of the self-attaching fastener shown in FIG. 1;

FIG. 3 is a cross-sectional view through line 3-3 of FIG. 2;

DETAILED DESCRIPTION OF THE INVENTION

Figure 4:
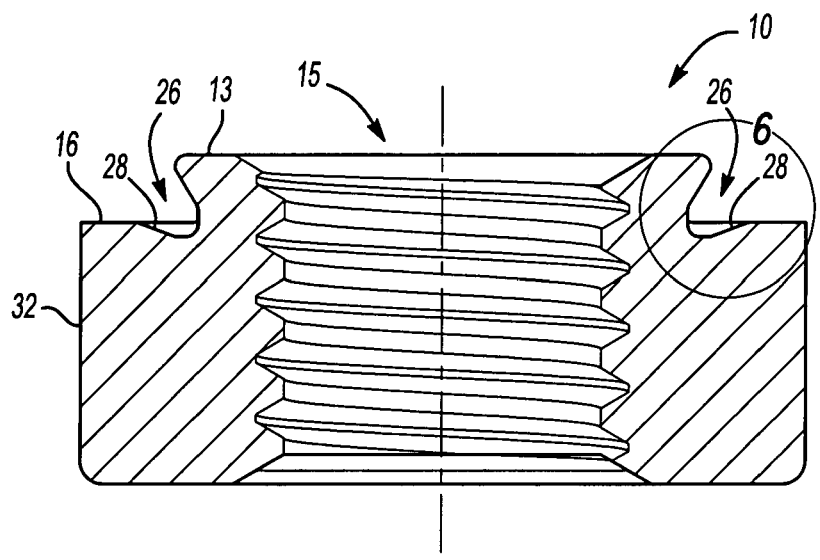
FIG. 4 is a cross-sectional view through line 4-4 of FIG. 2.

A self-attaching fastener of the present invention is generally shown in FIG. 1 at 10. The fastener 10 represented in FIG. 1 may be used as a self-piercing or self-clinching fastener as the end user may desire. In the event that the fastener 10 is used as a self-piercing fastener, a pilot portion 12 pierces an aperture through a metal panel (not shown) as is known to those of skill in the art. Alternatively, if the fastener 10 is used merely as a self-clinching fastener, the pilot portion 12 is inserted through a pre-pierced hole as is also known to those of skill in the art.

An annular flange 14 surrounds the central pilot portion 12 and has a generally planar end face 16 defining a peripheral edge 18. The central pilot portion 12 terminates at a pilot end 113 that is also generally planar and substantially parallel to the generally planar end face 16. The pilot portion 12 defines a bore 15 that is threaded or un-threaded depending upon the desired application. The peripheral edge 18 of the annular flange 14 includes a diameter that is greater than a diameter of the outer side wall 20 of the central pilot portion 12 and is therefore extended radially outwardly from the central pilot portion 12.

A plurality of first anti-rotation elements 22 are circumferentially spaced around the planar end face 16. Each of the anti-rotation elements 22 include a top face 24 that is planar that extends above the planar end face 16 of the annular flange 14. A plurality of second anti-rotation elements 26 are also circumferentially spaced around the planar end face 16 of the annular flange 14. Each of the second anti-rotation elements 26 includes a second top face 28 that is spaced below the planar end face 16 of the annular flange 14.

As is best represented in FIG. 1 and FIG. 2, the first anti-rotation elements 22 and the second anti-rotation elements 26 alternate in a circumferentially spaced relationship around the pilot portion 12. Each of the first and second anti-rotation elements 22, 26 extend from one of the peripheral edge 18 of the annular flange 14 and about the outer side wall 20 of the central pilot portion 12 to a location that is spaced from the other of the peripheral edge 18 and the outer side wall 20 of the central pilot portion 12. Each of the first and second anti-rotation elements 22, 26 assist driving the panel radially inwardly toward the pilot portion 12 during installation. This increases the amount of panel material disposed beneath the undercut defined by the inclined outer surface 36 of the pilot portion 12.

Figure 5:
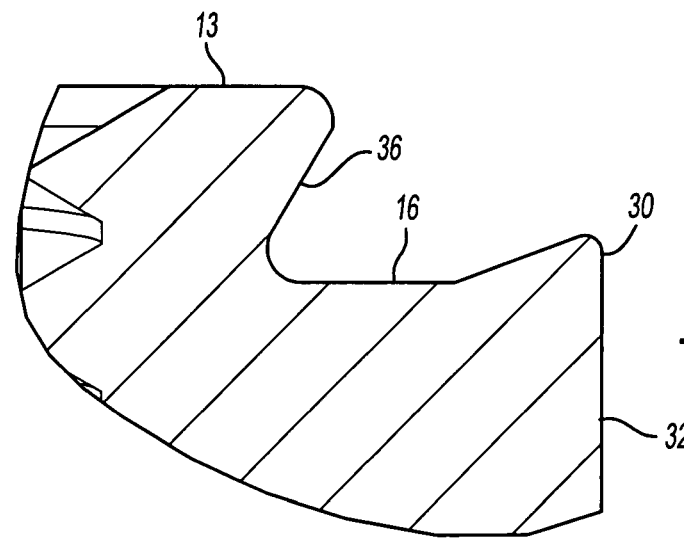
FIG. 5 is an expanded view of one anti-rotational feature marked circle 5 in FIG. 3.

In a first embodiment, the first anti-rotation elements 22 each extend radially inwardly toward the central pilot portion 12 from about the peripheral edge 18 of the planar end face 16. As best shown in FIGS. 3 and 5, each first anti-rotation element 22 defines a distal wall 30 that is planar with the outer annular wall 32 of the annular flange 14. Furthermore, the first top face 24 of the first anti-rotation element 22 is inclined relative to the planar end face 16 of the annular flange 14 sloping downwardly toward the central pilot portion 12. Each of the first anti-rotation elements 22 also include opposing side walls 34 that are angled so that each of the first anti-rotation elements 22 defines a trapezoidal cross-section. As is best known to those of skill in the art, a trapezoidal cross-section provides die relief when removing the fastener 10 from the forming die.

The first top face 24 defines an angle with the generally planar end face 16 of between about 18° and 22°. More preferably, the first top face 24 defines an angle with the generally planar end face 16 of about 20°. The second top face 28 defines and angle with the generally planar end face 16 of between about 13° and 17°. More preferably, the second top face defines 28 defines an angle with the generally planar end face 16 of about 15°. Therefore, the preferred ratio between the angle defined between the first top face 24 and the generally planar end face 16 to the second planar end face 28 and the generally planar end face 16 is between about 1.7 and 1.1. A more preferred ratio is about 1.3. The angles and ratios set forth above have proven to provide the optimum panel packing toward the undercut 36 to enhance retention of the fastener 10 to the panel.

Figure 6:
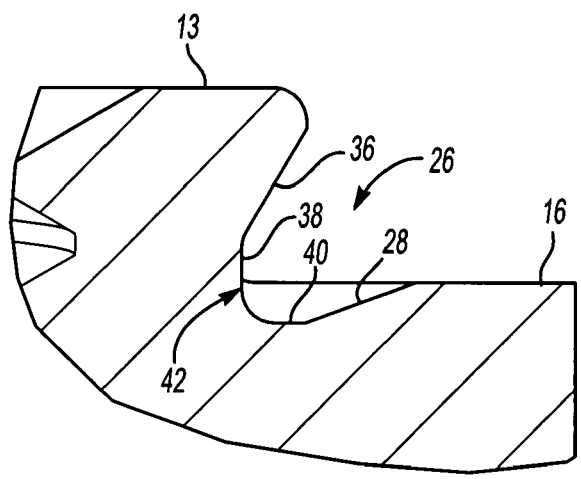
FIG. 6 is an expanded view of another anti-rotational feature marked in circle 6 of FIG. 4.

Referring now to FIGS. 4 and 6, each of the second anti-rotation elements 26 extend radially outwardly from an undercut 36 of the central pilot portion 12. As best seen in FIG. 6, the outer side wall 20 of the pilot portion 12 defines an inclined surface 36 sloping radially inwardly toward a generally vertical surface 38. The generally vertical surface 38 extends downwardly below the planar end face 16 of the annular flange 14 at the second anti-rotation element 26. The second anti-rotation element 26 defines a floor that is spaced below the planar end face 16 and transitions to the second top face 28 of the second anti-rotation element 26. Therefore, the second anti-rotation elements 26 each extend radially outwardly from a base 42 of the pilot portion 12 that is defined by the generally vertical surface 38. The each of the second anti-rotation elements 26 also extends radially outwardly from beneath the undercut defined by inclined surface 36 at spaced locations to a location spaced from the peripheral edge 18 of the annular flange portion 14.

Figure 7:
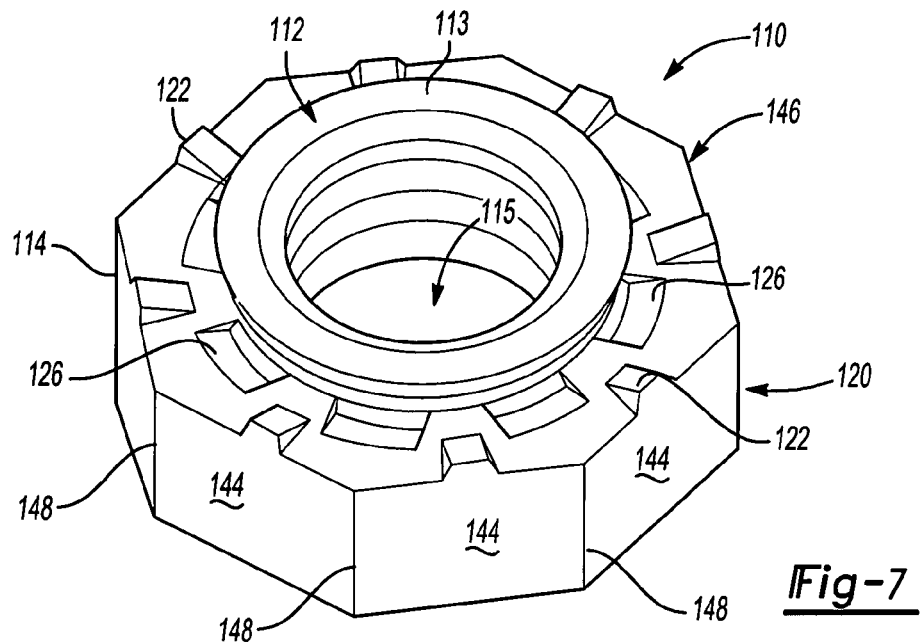
FIG. 7 is a perspective view of an alternative embodiment of the self-attaching female fastener having an octagonal outer wall.
Figure 8:
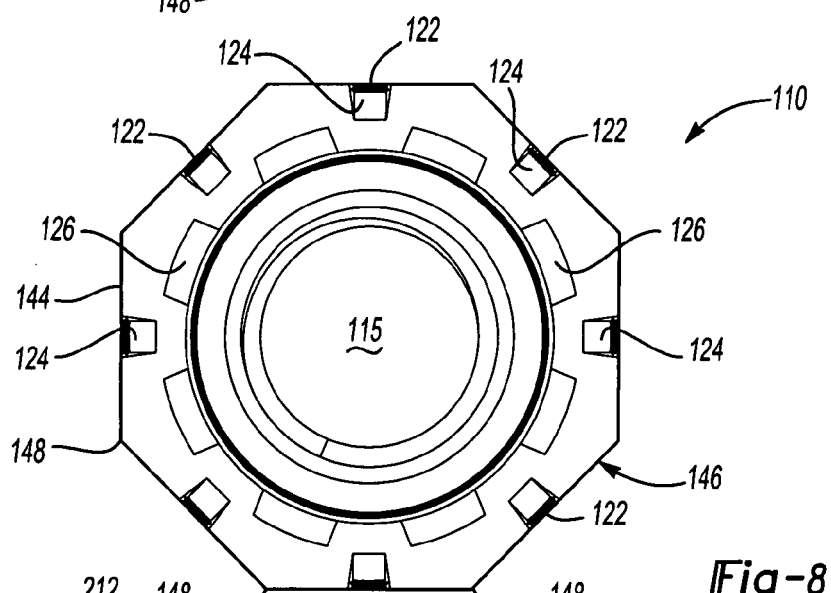
FIG. 8 is a plan view of the alternative embodiment of the self-attaching female fastener.

A first alternative embodiment is generally shown in FIGS. 7 and 8 at 110 where like elements to the previous embodiment are represented in the 100 series for simplicity. The fastener 110 of this embodiment includes a pilot portion 112 and an annular flange 114, an outer side wall 120 is defined by a plurality of flange walls 144 that are generally planar. In this embodiment, eight flange walls 144 define an octagonal peripheral edge 146 or circumference of the fastener 110. The first anti-rotation elements 122 are spaced generally centrally upon each flange wall 144 and the second anti-rotation elements 126 oppose an intersection 148 between adjacent flange walls 144. However, it should be understood by those of skill in the art that the first anti-rotation elements 122 may be positioned opposing the intersection 148 of adjacent flange walls 144 and that the second anti-rotation element 126 may be located generally centrally to each flange wall 144. Alternative geometric shapes may also be selected having more or less adjacent flange walls 144 defining, for example, a hexagonal outer side wall 120.

Figure 9:
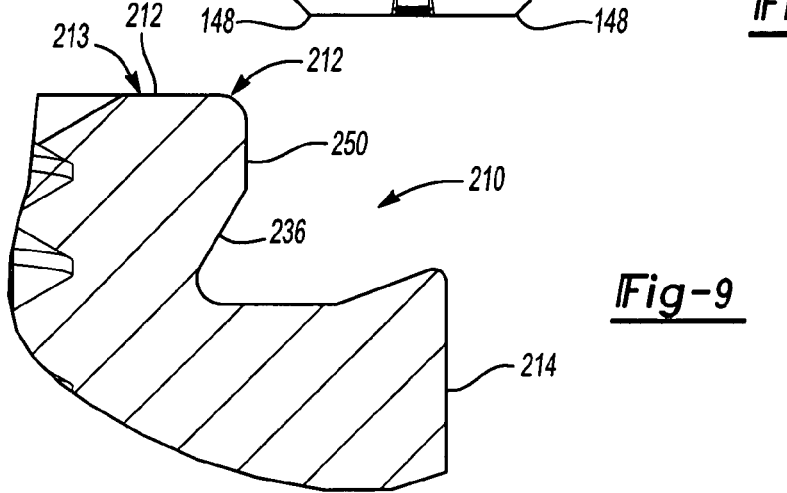
FIG. 9 is a partial sectional view of the pilot portion of an alternative embodiment.

A further alternative embodiment is shown in FIG. 9 at 210 where like elements to previous embodiments are represented in the 200 series for simplicity. This embodiment is desirable for even thicker panel cross sections and previous embodiments where a central pilot portion 212 is extended axially to the annular flange 214. In this embodiment, a cylindrical annular surface 250 extends downwardly from an upper surface 252 of the pilot portion 212 toward the flange portion 214. An inclined surface 236 extends radially inwardly from the cylindrical surface 250 defining an undercut at the pilot portion 212. The inclined surface 236 terminates at the planar end face 216 between each of the second anti-rotation elements 26 and at the floor 40 at the second anti-rotation element 26 as set forth in the previous embodiments.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

The invention claimed is:

1. A self-attaching fastener, comprising:
   a central pilot portion having an outer side wall being annular;
   an annular flange surrounding the central pilot portion, said annular flange having a planar end face defining a peripheral edge with a diameter greater than a diameter of said outer side wall of said central pilot portion;
   said planar end face including a plurality of circumferentially spaced first anti-rotation elements, each of said first anti-rotation elements having a planar top face spaced above said planar end face of said annular flange, said planar end face further including a plurality of circumferentially spaced second anti-rotation elements, each of said second anti-rotation elements having a planar top face spaced below said planar end face of said annular flange, one of said plurality of first anti-rotation elements and said plurality of second anti-rotation elements radially extending from said peripheral edge of said annular flange to a location spaced from said outer side wall of said central pilot portion, the other of said plurality of first anti-rotation elements and said plurality of second anti-rotation elements radially extending from said outer side wall of said central pilot portion to a location spaced from said peripheral edge of said annular flange,
   said first anti-rotation elements circumferentially alternating with said second anti-rotation elements.

2. The fastener set forth in claim 1, wherein said first anti-rotation elements extend radially inwardly toward said central pilot portion from said peripheral edge of said planar end face.

3. The fastener set froth in claim 1, wherein each of said top faces of said first anti-rotation elements and said second anti-rotation elements is inclined relative to said planar end face of said annular flange.

4. The fastener set forth in claim 1, wherein said first anti-rotation elements define a trapezoidal cross-section.

5. The fastener set forth in claim 1, wherein said annular flange defines an outer radial flange wall and said first anti-rotation elements define an outer radial element wall having a common plane with said outer radial flange wall.

6. The fastener set forth in claim 5, wherein said outer radial flange wall defines a polygonal shape comprising a plurality of abutting planar surfaces.

7. The fastener set forth in claim 6, wherein each of said first anti-rotation elements is aligned generally centrally with one of said planar surfaces.

8. The fastener set forth in claim 1, wherein said second anti-rotation elements extend radially outwardly from a base of said central pilot portion.

9. The fastener set forth in claim 1, wherein said central pilot portion defines an undercut and said second anti-rotation elements extend radially outwardly from beneath said undercut upwardly to a location spaced from said edge of said annular flange.

10. The fastener set forth in claim 1, wherein said pilot portion defines a top face and an inclined outer wall, said inclined outer wall being spaced from said top face.

11. The fastener set forth in claim 1, wherein said pilot portion defines a top face and an inclined outer wall spaced from said top face by a generally cylindrical wall.

12. The fastener set forth in claim 1, wherein said planar top faces have an incline ratio of between about 1.7 and 1.1.

13. The fastener set forth in claim 1, wherein said planar top faces have an incline ratio of about 1.3.

14. A self-attaching fastener, comprising:
    a central pilot portion having an outer side wall being annular;
    an annular flange surrounding the central pilot portion, said annular flange having a planar end face defining a peripheral edge with a diameter greater than a diameter of said outer side wall of said central pilot portion;
    said planar end face including a plurality of circumferentially spaced first anti-rotation elements, each of said first anti-rotation elements having a planar top face spaced above said planar end face of said annular flange, said planar end face further including a plurality of circumferentially spaced second anti-rotation elements, each of said second anti-rotation elements having a planar top face spaced below said planar end face of said annular flange, one of said plurality of first anti-rotation elements said plurality of second anti-rotation elements radially extending from said peripheral edge of said annular flange to a location spaced from said outer side wall of said central pilot portion, the other of said plurality of first anti-rotation elements and said plurality of second anti-rotation elements radially extending from said outer side wall of said central pilot portion to a location spaced from said peripheral edge of said annular flange,
    said first anti-rotation elements circumferentially alternating with said second anti-rotation elements,
    said planar top faces having an angular incline ratio of between about 1.7 and 1.1.

15. The fastener set forth in claim 14, wherein said planar top faces have an incline ratio of about 1.3.

16. The fastener set forth in claim 14, wherein said first anti-rotation elements extend radially inwardly toward said central pilot portion from said peripheral edge of said planar end face.

17. The fastener set forth in claim 14, wherein each of said top faces of said first anti-rotation elements and said second anti-rotation elements is inclined relative to said planar end face of said annular flange.

18. The fastener set forth in claim 14, wherein said first anti-rotation elements define a trapezoidal cross-section.

19. The fastener set forth in claim 14, wherein said annular flange defines an outer radial flange wall and said first anti-rotation elements define an outer radial element wall having a common plane with said outer radial flange wall.

* * * * *